April 4, 1939.  H. N. FAIRBANKS  2,153,142

FILM ADVANCING MECHANISM FOR MOTION PICTURE APPARATUS

Filed Sept. 23, 1937

Henry N. Fairbanks
INVENTOR

BY Newton M. Perkins
George L. Gillette, Jr.
ATTORNEYS

Patented Apr. 4, 1939

2,153,142

UNITED STATES PATENT OFFICE 2,153,142

FILM ADVANCING MECHANISM FOR MOTION PICTURE APPARATUS

Henry N. Fairbanks, Rochester, N. Y., assignor to Eastman Kodak Company, Rochester, N. Y., a corporation of New Jersey Application September 23, 1937, Serial No. 165,362
In Germany September 25, 1936

3 Claims. (Cl. 88—18.4)

The present invention relates to a film advancing mechanism for motion picture apparatus and, more particularly, to a resilient member conveniently located and arranged to urge the claw member of the film advancing mechanism toward the perforated film strip.

The use of resilient members in film advancing mechanisms to urge a claw member toward the film strip is well known, particularly in film advancing mechanisms of the ratchet type. However, the provision of such a resilient member in apparatus which has been compactly designed is difficult, especially such provision which will give the proper magnitude and application of the resilient pressure.

The primary object of the present invention is the provision in a film advancing mechanism of a resilient member mounted at one side of the exposure aperture in a motion picture apparatus and for engaging and urging the claw member toward the film strip. Another object of the invention is the provision of a resilient member which is mounted on one side of the exposure aperture and which is arranged to extend around said aperture for engagement with the claw member on the other side thereof. A further object of the invention is the provision of a resilient member composed of a plate spring which is provided with an opening at least as large as the exposure aperture of the apparatus. Still another object is the provision of a U-shaped spring wire member which is mounted in inverted position for selectively pressing the claw member toward the film strip. Other and further objects of the invention will suggest themselves to those skilled in the art by the description which follows.

The above and other objects of the invention are obtained in a motion picture apparatus provided with an exposure opening, having a film advancing means located at one side of the opening and including a claw member for engaging the marginal perforations on the near side of a film strip and a resilient member mounted on the opposite side of the exposure opening and arranged to extend around said opening for engagement with the claw member to urge it toward the film strip. Such a resilient member is preferably provided in the form of a rectangular plate spring provided with an opening corresponding to the exposure aperture of the apparatus, but may alternately be provided as a U-shaped spring wire which is mounted in inverted position having one leg attached at one side of the exposure opening and having the other leg extending around the opening to engage the claw member.

Reference is hereby made to the accompanying drawing, wherein similar reference characters designate similar elements and wherein.

Figure 1:
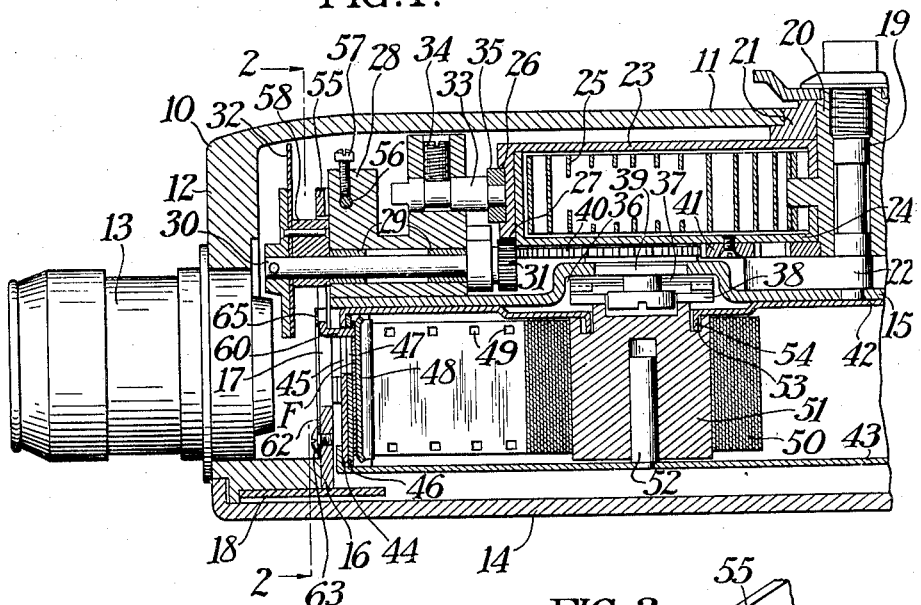
Fig. 1 is a transverse cross-section of a motion picture apparatus equipped with a film advancing mechanism according to the invention and taken on the line 1—1 of Fig. 2.

In the illustrated embodiment, the resilient member of the invention is shown as applied to a film advancing mechanism of the ratchet type and for a motion picture camera. However, it is understood that said resilient member of the invention may be applied with equal advantage to all types of motion picture apparatus and to all types of film advancing mechanisms.

Referring now to the drawing, the motion picture apparatus is enclosed within a housing 10 having a side wall 11 and a front wall 12. An objective assembly 13 is attached to said front wall 12. A cover 14 encloses housing 10 and a magazine chamber is provided therein. Internally the apparatus includes a mechanism plate 15 extending longitudinally of housing 10, a front plate 16 provided with an exposure opening 17 and a cover plate 18 mounted on front wall 12 and over-hanging the magazine chamber.

The prime mover for the apparatus is a spring motor comprising a winding shaft 19, an internal sleeve 20 rotatively mounted between a bushing 21 in side wall 11 and a bearing 22 on mechanism plate 15, and a pair of telescoping cases 23 and 24, which enclose the motor spring 25 operatively connected in a known manner. The case 24 of said spring motor is provided with a peripheral groove 26 and a crown gear 27.

Intermediate mechanisms are mounted upon a block 28 including sleeve bearings 29 within which a shaft 30 is mounted. A spur gear 31 is mounted on one end of shaft 30 and meshes with the crown gear 27 of the spring motor. A disk shutter 32 is mounted upon the other end of shaft 30 and is arranged to overlap the exposure opening 17 in conventional fashion.

A stub shaft 33 is adjustably secured in block 28 by a set-screw 34 and carries a roller 35 fitting into the peripheral groove 26 of the spring motor to supervise the engagement between crown gear 27 and spur gear 31.

The take-up mechanism may be of conventional design or may be provided as follows. A clutch assembly is rotatably mounted within a circular recess 36 in mechanism plate 15 and comprises a driving member 37 carrying resiliently engaging members 38 and a journal 39 attached to a pinion gear 40. A ring gear 41 is attached to case 24 for rotation with the spring motor and meshes with said pinion gear 40.

A film guiding means is associated with the front plate 16 to support a film strip across the exposure opening 17. Such a film guiding means may be provided in conventional manner either as a presser member or as a complete gate in a film magazine. As shown, the film magazine comprises a casing 42 enclosed by a cover 43 and having a lateral wall 44 which is provided with an exposure aperture 45. The film strip F is resiliently held against an internal plate 46, also provided with an exposure aperture 47, by a presser pad 48. Said film strip F has the usual marginal perforations 49 and extends from the film gate in the magazine to the take-up film roll 50. Said film roll 50 is wound upon a core 51, which is rotatively mounted upon a spindle 52 on magazine cover 43 and is provided with a groove 53 interengaging a ring 54 formed from the magazine casing 42. One end of core 51 is provided with teeth or serrations, not shown, but which are engaged by the resilient engaging members 38 of the take-up clutch assembly.

The exposure opening 17 may frame or mask the film strip F or may provide an exposure opening larger than the frame which, as illustrated, is determined by the exposure apertures 45 and 47 in the film magazine.

Figure 3:
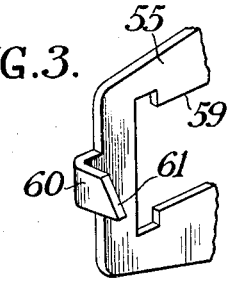
Fig. 3 is a fragmentary perspective of the film engaging claw of claw member.

The film advancing mechanism may comprise a claw member 55 rotatably and slidably engaging a rod 56, held in block 28 by a set-screw 57. A cam 58 is mounted on shaft 30 and engages the sides of an opening 59 in claw member 55 to reciprocate the same along rod 56 with rotation of shaft 30. The claw 60 of claw member 55 may extend through the exposure opening 17 and exposure apertures 45 and 47 into engagement with the marginal perforations 49 of the film strip F. For ratchet types of film advancing mechanisms, said claw 60 will be provided with an inclined face 61, see Fig. 3.

The compact design of the apparatus dictates that said film advancing mechanism be located at one side of the film strip and that the claw member 55 extend laterally for engagement with the film perforations at or near the exposure openings. Such an arrangement presents a problem in the provision of a resilient member to act upon such claw member 55. Obviously, the resilient member can not be provided on the same side of the exposure opening as the film advancing mechanism. Consequently, according to the invention, such resilient member is mounted on the opposite side of the exposure opening and extends around the opening for engagement with the claw member 55. As a result, the exposure is made through the resilient member.

Figure 2:
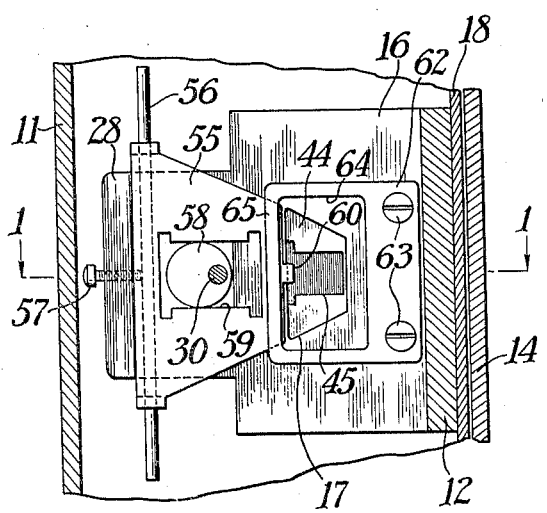
Fig. 2 is a fragmentary section taken on the line 2—2 of Fig. 1.

The preferred form of resilient member is illustrated in Figs. 1 and 2 and comprises a rectangular plate spring 62 secured by screws 63 to front plate 16 at one side of exposure opening 17 and provided with an opening 64 at least as large as exposure opening 17. The free end 65 of plate spring 62 bears upon claw member 55 to urge claw 60 into engagement with the marginal perforations 49 of the film F. This arrangement is extremely convenient and permits considerable latitude in the tension and application of the spring pressure to claw member 55.

Figure 4:
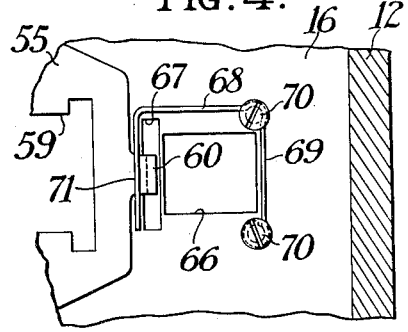
Fig. 4 is a fragmentary front elevation of the film advancing mechanism equipped with the modified form of resilient member.

Although it is more convenient to provide exposure opening 17 large enough so that claw 60 may extend therein, it is also possible to provide a separate exposure opening 66 and a separate claw slot 67 in the front plate 16, see Fig. 4. The resilient member may alternatively be provided as a U-shaped spring wire member 68 having one leg 69 secured by screws 70 at one side of exposure opening 66 and having another leg 71 engaging the claw 60 of claw member 55. It should be noted that, by virtue of the cantilever support for leg 71, the pressure exerted on claw 60 varies depending upon the position of the claw in slot 67. For instance, when claw 60 is at the top of slot 67 and is in position to enter the film perforation, the resilient pressure exerted by said spring wire member 68 will be maximum, whereas when claw 60 is at the bottom of claw slot 67, the spring pressure is at a minimum, so that there will be less spring resistance to withdrawal of the claw from the perforation by the inclined surface 61.

Since many variations of the present invention will occur to those skilled in the art from the foregoing disclosure, the present invention is limited only by the claims which follow.

Having now particularly described my invention what I desire to secure by Letters Patent of the United States and what I claim is:

1. In a motion picture apparatus, the combination with an objective assembly, a frame member provided with an exposure opening which is in alignment with said objective assembly, a film guiding means behind said frame member for supporting across said opening a film strip having perforations along at least one margin thereof, and a film advancing means located at one side of said frame member and including a claw member in front of said frame member and extending therethrough for engaging the marginal perforations on the near side of said film strip, adjacent the opening in said frame member, and for intermittently advancing said film strip, of a plane spring member mounted on the front of said frame member at the opposite side of said exposure opening with respect to said film advancing means, provided with an opening corresponding to said exposure opening and for engaging and urging said claw member, on the near side of said opening, toward the film strip.

2. In a motion picture apparatus, the combination with a frame member provided with an exposure opening, a film guiding means associated with said frame member for supporting across said opening a film strip having perforations along at least one margin thereof, and a film advancing means located at one side of said frame member and including a claw member for engaging the marginal perforations on the near side of said film strip, adjacent the opening in said frame member, and for intermittently advancing said film strip, of a plane plate spring member rectangularly arranged and provided with an opening corresponding to said exposure opening, having a portion mounted on said frame member at the opposite side of said opening with respect to said film advancing means and having an opposed portion engaging said claw member to urge the same toward the film strip.

3. In a motion picture apparatus, the combination with an objective assembly, a frame member provided with an exposure opening which is in alignment with said objective assembly, a film guiding means behind said frame member for supporting across said opening a film strip having perforations along at least one margin thereof, and a film advancing means located at one side of said frame member and including a claw member in front of said frame member and extending therethrough for engaging the marginal perforations on the near side of said film strip, adjacent the opening in said frame member, and for intermittently advancing said film strip, of a plate spring member provided with an opening at least as large as said exposure opening, having a side portion fastened to the front of said frame member at the opposite side of the exposure opening with respect to said film advancing means, and having an opposed free portion engaging said claw member to urge the same toward the film strip.

HENRY N. FAIRBANKS.